UNITED STATES PATENT OFFICE 2,656,382

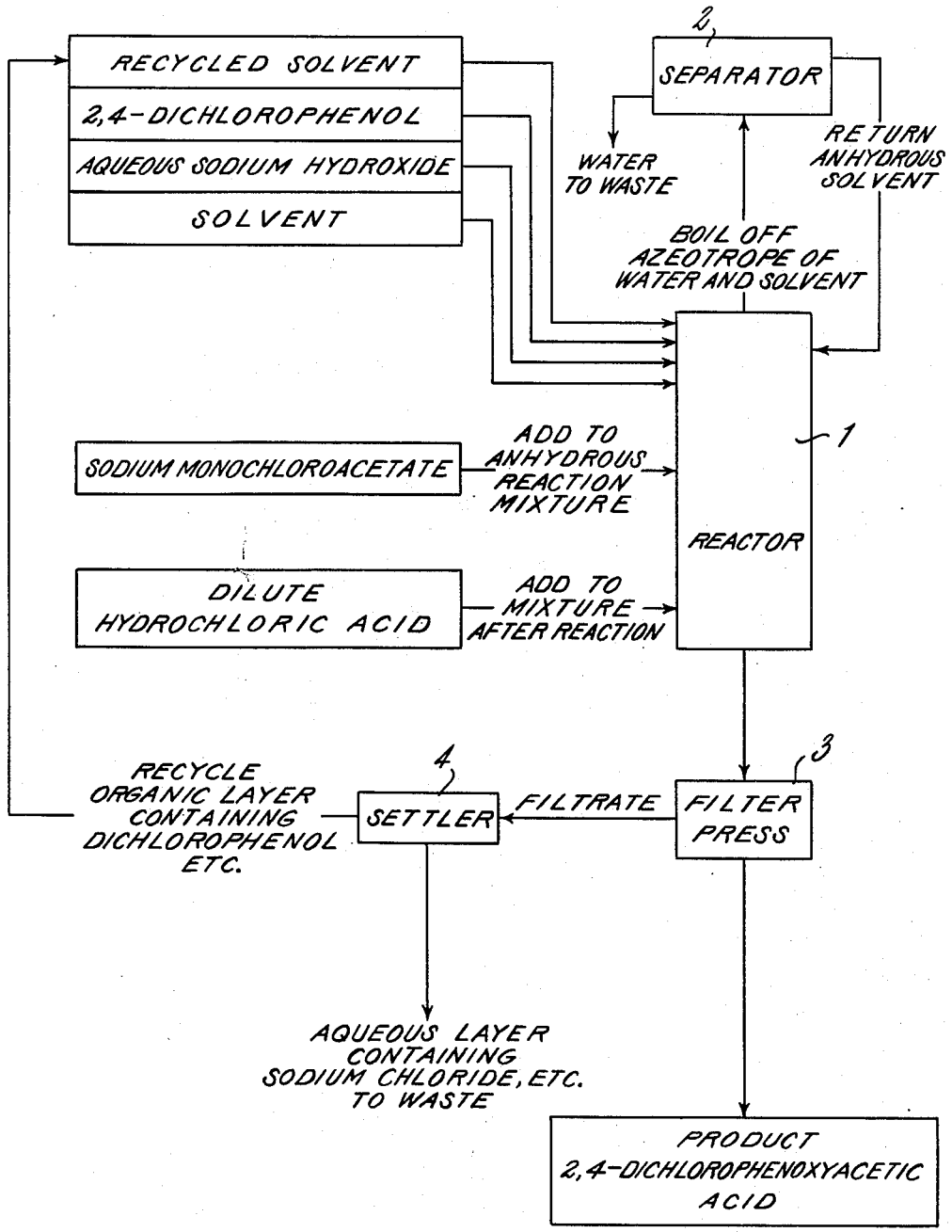

PREPARATION OF 2,4-DICHLOROPHENOXY-ACETIC ACID

Marshall Kulka, Guelph, Ontario, and John C. R. Warren, Elmira, Ontario, Canada, assignors to United States Rubber Company, New York, N. Y., a corporation of New Jersey Application January 30, 1952, Serial No. 269,006

3 Claims. (Cl. 260—521)

This invention relates to the preparation of 2,4-dichlorophenoxyacetic acid, and more particularly it relates to the preparation of 2,4-dichlorophenoxyacetic acid in an anhydrous medium. This compound has come into widespread use as a weed killer, and it has been desired to produce it by more economical and more efficient methods than those heretofore known.

The preparation of 2,4-dichlorophenoxyacetic acid has heretofore been carried out in the presence of water by reacting an alkali metal salt of 2,4-dichlorophenoxyacetic acid and an alkali metal salt of monochloroacetic acid to yield the alkali metal salt of 2,4-dichlorophenoxyacetic acid. The reaction involved may be expressed as follows:

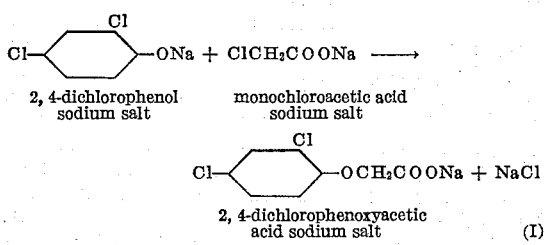

Addition of an acid to the resulting salt produces the desired 2,4-dichlorophenoxyacetic acid as follows:

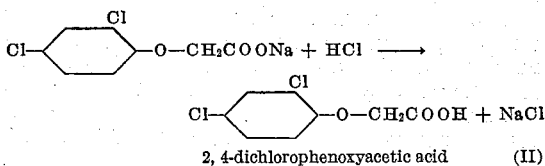

It has formerly been considered essential to have an aqueous phase in the reaction mixture, and it is in such aqueous phase that the reaction largely took place. The yield of the desired product obtainable with the prior art methods has been limited by the fact that under aqueous conditions an appreciable fraction of the sodium monochloroacetate hydrolyzes according to the following equation to form a glycolic acid:

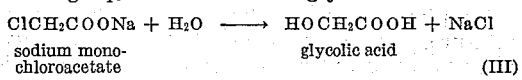

However, if it is attempted to dispense with the water present in order to suppress this hydrolysis reaction and thereby increase the conversion of sodium monochloroacetate, for example, if sodium 2,4-dichlorophenoxide and sodium monochloroacetate are suspended in an anhydrous inert organic liquid reaction medium, and then heated to effect reaction, it is found that sodium 2,4-dichlorophenoxyacetate is formed only very slowly, and therefore the process is not suited to commercial preparation of the desired product. This is because the reaction mixture is essentially heterogeneous, that is, the reaction mixture consists of essentially solid reactants suspended in the liquid medium, and such reaction conditions are not conducive to rapid reaction. Furthermore, such a reaction mixture tends to take on the form of a very thick slurry which is almost impossible to stir and is otherwise difficult to handle. This is true even if the sodium 2,4-dichlorophenolate reactant is employed in a molar excess quantity.

It has now been discovered that when a relatively small amount of free 2,4-dichlorophenol is present as such in a suspension of the alkali metal salt of 2,4-dichlorophenol and alkali metal salt of monochloroacetic acid in an anhydrous inert organic liquid reaction medium, the reaction proceeds very rapidly and in almost quantitative yield. Furthermore, the reaction mixture, instead of being a thick heavy slurry, takes the form of a solution or a very thin slurry that presents no difficulty in stirring or handling. The invention therefore provides a practical method for making 2,4-dichlorophenoxyacetic acid under anhydrous conditions which produce substantially higher yields than have heretofore been considered possible, due to the fact that hydrolysis of the alkali metal salt of monochloroacetic acid is largely suppressed, with resulting higher conversion of this material to the desired product.

An embodiment of the invention is shown in the accompanying drawing, which is a diagrammatic flow sheet representing the essential steps in one method of carrying out the invention.

The invention contemplates preparing 2,4-dichlorophenoxyacetic acid by heating a mixture of an alkali metal salt of 2,4-dichlorophenol and an alkali metal salt of monochloroacetic acid in an anhydrous inert organic liquid medium, in the presence of free 2,4-dichlorophenol. The reaction mixture is cooled and acidified to precipitate the 2,4-dichlorophenoxyacetic acid product. The time required for completion of the reaction at a given reaction temperature depends upon the amount of free 2,4-dichlorophenol present. Thus, in the presence of 0.25 mole of 2,4-dichlorophenol per mole of sodium chloroacetate the reaction duration at a temperature of 95° C. is 4 hours, while in the presence of 1 mole of 2,4-dichlorophenol the reaction time is only 2 hours. At higher temperatures the reaction is even more rapid and is complete in 5 minutes at about 132° C. in the presence of only 0.1 mole of 2,4-dichlorophenol. It is generally found that as little as 0.05 mole of free 2,4-dichlorophenol in the reaction mixture produces an appreciable decrease in the reaction time, although it is usually preferred to use at least about 0.1 mole. Larger amounts of 2,4-dichlorophenol may be present in the reaction mixture, although it is usually found that there is no appreciable advantage, either with respect to decrease in reaction time, or to increase in yields, in using more than about 1 or 2 moles of free 2,4-dichlorophenol in the anhydrous reaction mixture. For reasons of economy, not more than about 1 mole of free 2,4-dichlorophenol is usually employed.

The explanation for the effect of the free 2,4-dichlorophenol on the anhydrous mixture is believed to be that it makes the reacting salts soluble in the reaction medium. It is observed that the consistency of the reaction mixture varies from a thin slurry to an almost complete solution, depending upon the amount of 2,4-dichlorophenol used, that is, increasing amounts of free 2,4-dichlorophenol correspondingly increase the fluidity of the reaction mixture, presumably because of the solubilizing effect of the free 2,4-dichlorophenol on the reacting salts.

The organic liquid carrier which is employed as the reaction medium in the practice of the present invention should have the following characteristics. It should be inert under the conditions of reaction. It should be a good solvent for the 2,4-dichlorophenol. It should exhibit a considerably lower solubility for the 2,4-dichlorophenoxyacetic acid product than for the 2,4-dichlorophenol. It should be substantially water-insoluble so that it forms a separate liquid phase after acidification of the reaction mixture with aqueous acid and cooling and so that losses due to solubility of the solvent in water are reduced. Examples of suitable solvents are hydrocarbons such as paraffins, olefins, cyclo-paraffins, monocyclic aromatic hydrocarbons such as benzene, toluene and xylene, and halogenated hydrocarbons such as halogenated paraffins and olefins, for example carbon tetrachloride, perchlorethylene, ethylene dichloride, etc., halogenated cycloparaffins such as chlorocyclohexane, halogenated monocyclic aromatic hydrocarbons such as monochlorobenzene, orthodichlorobenzene, etc. We prefer to use monochlorobenzene. The organic solvent which is used should be liquid at the temperatures prevailing during the process. Its boiling point should be sufficiently high that the desired reaction takes place at a suitably rapid rate when the reaction mixture is refluxed at ordinary pressures. Usually organic liquids having a boiling point of from 70 to 200° C. are employed. Generally, the organic liquid carrier is employed in amount of from 100 to 200% by weight of the reactants. It will be understood that the reactants, viz., the alkali metal salts of 2,4-dichlorophenol and monochloroacetic acid, are essentially insoluble in the organic liquid medium, and react only very slowly therein, unless free 2,4-dichlorophenol is present to exert a solubilizing effect on the reactants.

In practicing the invention it is preferred to employ the reactants in the form of the sodium salts on account of cheapness and availability, although other alkali metal salts such as those of potassium or lithium may be employed.

The sodium salt of 2,4-dichlorophenol may be made by dissolving the 2,4-dichlorophenol in a suitable solvent, suitably the same solvent that is to be used as the inert organic liquid reaction medium, such as monochlorobenzene, and adding thereto a strong aqueous solution of sodium hydroxide. This mixture may then be boiled to remove water azeotropically with the monochlorobenzene, which can be separated from the distillate and returned to the reaction mixture. After all of the water is removed in this way, there remains a slurry of sodium 2,4-dichlorophenoxide in monochlorobenzene, and this anhydrous mixture may be used directly for subsequent reaction with sodium monochloroacetate to yield the desired product. Another convenient procedure is to simply commingle an aqueous sodium hydroxide solution with 2,4-dichlorophenol, and drop the resulting hot solution on a heated flaking drum, producing flakes of dry sodium 2,4-dichlorophenoxide.

The alkali metal salt of monochloroacetic acid, such as sodium monochloroacetate, may be prepared beforehand by any suitable method, such as by neutralizing a methanol solution of monochloroacetic acid with strong aqueous sodium hydroxide at about 10° C., following the method of Sporzynski, Kocay and Briscoe, Rec. trav. chim. 68, 613 (1949) [C. A. 44, 2445 (1950)]. It is preferred to employ more than 1 mole, e. g. from about 1.2 to 2 moles, of the alkali salt of 2,4-dichlorophenol to each mole of the alkali salt of monochloroacetic acid. The reactants are added in these proportions to the inert organic liquid reaction medium, along with at least 0.05 mole, and usually from about 0.1 mole to 1 mole, of free 2,4-dichlorophenol.

The reaction temperature conveniently is the boiling point of the mixture, which may range from 70° to 140° C., depending upon the composition of the reaction mixture and the pressure. Usually it is preferred to employ essentially atmospheric pressure. It is preferred to use as high a temperature as is feasible in order to promote rapid reaction, and in some cases, as where the solvent is relatively low boiling, the reaction may be conducted under pressure in order to secure higher reaction temperatures. Preferably the reaction mixture is vigorously agitated during the process.

After completion of the reaction between the alkali metal salts of the reactants, the reaction mixture containing the sodium salt of 2,4-dichlorophenoxyacetic acid is cooled if necessary to bring the temperature thereof appreciably below 100° C., say to about 90° C., and then dilute acid, usually dilute sulfuric acid or hydrochloric acid, is added to precipitate free 2,4-dichlorophenoxyacetic acid from the reaction medium. The product may be removed from the reaction medium in any suitable manner, as by filtration or by centrifuging. The remaining liquid will contain 2,4-dichlorophenol, representing the excess free 2,4-dichlorophenol that was added to the reaction mixture, as well as 2,4-dichlorophenol formed from the unreacted alkali salt of 2,4-dichlorophenol upon acidification of the reaction mixture. Such unconverted 2,4-dichlorophenol remains dissolved in the organic liquid reaction medium, which may be recycled to the economy of the process. The remaining liquid after separation of the desired product will also have an aqueous layer resulting from the acidification with dilute aqueous acid, which aqueous layer contains inorganic salts and other waste products that may be discarded.

The acidification of the reaction mixture is preferably conducted at a temperature which is sufficiently high that the reaction mixture is entirely liquid after acidification, i. e., so that no solidification of any of the components thereof takes place. The temperature at which the reaction mixture is acidified may conveniently range from 70 to 90° C. The acidified mixture is preferably cooled to a temperature below 60° C., and still more preferably to below 40° C., say down to room temperature or even lower, to effect precipitation of the 2,4-dichlorophenoxyacetic acid product. It is preferred to cool below 40° C. so that the balance of the solvent which is to be recycled does not have to be heated to avoid further precipitation. The lower the temperature to which the mixture is cooled, the more completely is the 2,4-dichlorophenoxyacetic acid thrown out of solution. However, the cooling should not be carried to so low a temperature that solidification of other materials present, especially water, takes place.

If desired, suitable provision may be made for purifying a portion of the recycled organic phase in order to keep the impurities in the system at a suitable low level. The purification of the recycled organic solvent may be accomplished in any desired manner, for example, by first distilling off the solvent and then the 2,4-dichlorophenol, the latter often being removed either by vacuum distillation or steam distillation. The organic phase can be recycled many times without purification.

Referring to the drawing, a typical procedure involving the present invention comprises adding to a reactor 1, containing a suitable inert organic liquid reaction medium, such as monochlorobenzene, about 1.2 to 1.5 moles of 2,4-dichlorophenol. The organic solvent is usually employed in about two times the weight of the 2,4-dichlorophenol. To this mixture is added a hot aqueous solution of sodium hydroxide in amount sufficient to neutralize at least 1.2 moles of the 2,4-dichlorophenol. The amount of sodium hydroxide employed should not be greater than that required to neutralize all of the 2,4-dichlorophenol present plus any 2,4-dichlorophenoxyacetic acid or other acids that may be present in the recycled carrier in order that there will be no free alkali in the reaction mixture. The heat of neutralization raises the temperature of the mixture, and an azeotrope consisting of water and monochlorobenzene is boiled off. The condensate is separated in a suitable separator 2, the organic layer being returned to the reactor 1 and the aqueous layer being discarded, and this procedure is continued until all of the water has been removed from the mixture in the reactor. One mole of sodium monochloroacetate is then added to the reactor, and this acid reacts with the sodium 2,4-dichlorophenoxide, as indicated in Equation I above, to form sodium 2,4-dichlorophenoxyacetate.

The reaction mixture is then refluxed at a temperature of about 132° C. for a period of about 15 minutes, which is usually more than sufficient to bring the reaction to completion. The reaction mixture is then cooled and acidified, as with dilute aqueous sulfuric acid, and the mixture is then cooled further to effect precipitation of the 2,4-dichlorophenoxyacetic acid, formed in accordance with Equation II, above. The mixture is then passed through a filter press 3 to remove the product, and the filtrate is passed to a suitable settler 4 in which the organic layer of the filtrate is allowed to separate from the aqueous layer. The organic layer may be recycled, and the aqueous layer may be discarded.

From the foregoing it is evident that the invention provides a convenient and economical method for production of 2,4-dichlorophenoxyacetic acid. Because of the anhydrous conditions prevailing in the reaction mixture when the sodium monochloroacetate reactant is present, there is little or no opportunity for this reactant to hydrolyze in accordance with Equation III, above, with consequent loss in yield of the desired product. For this reason, the present method makes it possible to obtain consistently yields substantially in excess of 90%, such yields being considerably higher than those obtainable by previously available practical methods of making 2,4-dichlorophenoxyacetic acid. The method of the invention furthermore provides for obtaining such high yields in unusually short reaction times, by providing free 2,4-dichlorophenol in the reaction medium. The 2,4-dichlorophenol exerts an exceptional solubilizing effect on the reactants, so that they readily enter into the inert organic liquid reaction medium even when no water is present, and combine to form the desired product in a very short time.

The following example will illustrate the invention in greater detail. In the example, all parts are expressed by weight.

*Example*

To a hot solution of 50 parts of sodium hydroxide (1.25 moles) in 40 parts of water, was added with stirring a solution of 220 parts of 2,4-dichlorophenol (1.35 moles) in about 550 parts of monochlorobenzene. The water was removed by azeotropic distillation, while continually returning dry monochlorobenzene to the reaction vessel. After removal of all of the water in this manner, 116.5 parts of sodium monochloroacetate (1 mole) was added to the anhydrous reaction medium, and the mixture was heated under reflux (about 132° C.) for 15 minutes. There resulted a thin slurry which was allowed to cool to about 90° C., and was then acidified with dilute hydrochloric acid, and further cooled to about 15° C., whereupon the desired 2,4-dichlorophenoxyacetic acid precipitated from the mixture. The product was filtered off and washed and oven dried. The chlorobenzene filtrate was reused in subsequent runs, and the yields of 2,4-dichlorophenoxyacetic acid ranged from 93 to 94%.

Having thus described our invention, what we claim and desire to protect by Letters Patent is:

1. The process of preparing 2,4-dichlorophenoxyacetic acid which comprises reacting a mixture of an alkali metal salt of 2,4-dichlorophenol and an alkali metal salt of monochloroacetic acid under anhydrous conditions in a medium comprising a substantially water-insoluble inert organic liquid which is a solvent for 2,4-dichlorophenol and which is selected from the group consisting of hydrocarbons and halogenated hydrocarbons, the said reaction mixture being maintained in a fluid state by the presence therein of free 2,4-dichlorophenol, whereby the said alkali metal salts are solubilized and react rapidly to form the desired 2,4-dichlorophenoxyacetic acid compound.

2. The process of preparing 2,4-dichlorophenoxyacetic acid which comprises reacting a mixture of sodium 2,4-dichlorophenol, sodium monochloroacetate, and free 2,4-dichlorophenol in an inert organic liquid medium comprising anhydrous monochlorobenzene.

3. The process of preparing 2,4-dichlorophenoxyacetic acid which comprises azeotropically distilling a mixture of aqueous sodium hydroxide and 2,4-dichlorophenol in an organic liquid medium comprising anhydrous monochlorobenzene until all of the water is removed therefrom, adding sodium monochloroacetate, heating the mixture at reflux temperature, acidifying the resulting reaction mixture at a temperature of from 70° to 90° C. with dilute aqueous acid, cooling the acidified mixture to a temperature below 40° C. and thereby effecting precipitation of 2,4-dichlorophenoxyacetic acid, separating the precipitate from the cooled reaction mixture, separating the residual liquid into an organic phase containing 2,4-dichlorophenol and an aqueous phase, and recycling said organic phase as a source of said 2,4-dichlorophenol.

MARSHALL KULKA.
JOHN C. R. WARREN.

References Cited in the file of this patent

UNITED STATES PATENTS

| Number | Name | Date |
| --- | --- | --- |
| 2,480,817 | Warren | Aug. 30, 1949 |